(12) United States Patent
Patil

(10) Patent No.: US 6,531,519 B2
(45) Date of Patent: Mar. 11, 2003

(54) ANTIMICROBIAL SYNTHETIC ION EXCHANGE RESINS

(75) Inventor: Arvind S. Patil, Davidson, NC (US)

(73) Assignee: Microban Products Company, Huntersville, NC (US)

( * ) Notice: Subject to any disclaimer, the term of this patent is extended or adjusted under 35 U.S.C. 154(b) by 0 days.

(21) Appl. No.: 09/733,733

(22) Filed: Dec. 8, 2000

(65) Prior Publication Data

US 2002/0072545 A1 Jun. 13, 2002

Related U.S. Application Data

(60) Provisional application No. 60/170,018, filed on Dec. 10, 1999.

(51) Int. Cl.[7] ............................. C08F 8/33; C08F 8/32
(52) U.S. Cl. ................. 521/33; 424/78.1; 427/213.3; 427/213.31; 427/213.34; 521/25; 521/31
(58) Field of Search ................. 521/32, 33; 427/213.3, 427/213.31, 213.34

(56) References Cited

U.S. PATENT DOCUMENTS

| | | | |
|---|---|---|---|
| 3,154,484 A | 10/1964 | Stoner | 210/35 |
| 4,076,622 A | 2/1978 | Costin | 210/64 |
| 4,187,183 A | 2/1980 | Hatch | 210/501 |
| 4,190,529 A | 2/1980 | Hatch | 210/29 |
| 4,199,449 A | 4/1980 | Slejko | 210/29 |
| 4,250,141 A | 2/1981 | Lehmann | 422/44 |
| 4,382,862 A | 5/1983 | Dillman | 210/668 |
| 5,108,863 A * | 4/1992 | Hsieh | 430/109 |
| 5,422,219 A * | 6/1995 | Anzai | 430/122 |
| 5,871,722 A * | 2/1999 | Nacht | 424/78.03 |

* cited by examiner

Primary Examiner—Fred Zitomer
(74) Attorney, Agent, or Firm—Dougherty, Clements & Hofer

(57) ABSTRACT

A method of preventing the growth of heterotrophic bacteria and the subsequent establishment of a biofilm on the surface and in the micropores of an antimicrobial synthetic ion exchange resin. An antimicrobial synthetic ion exchange resin that prevents the growth of heterotrophic bacteria and the subsequent establishment of biofilm on the surface and in the micropores of the resin. A broad spectrum organic antimicrobial agent that is water insoluble and thus precipitates out and becomes encapsulated within micropores of the resin during suspension polymerization. The antimicrobial agent is submicron sized and has a high surface area. The antimicrobial agent protects the antimicrobial synthetic ion exchange bead from the growth of heterotrophic bacteria and the subsequent establishment of biofilm on the surface and in the micropores of the resin. The antimicrobial agent is nontoxic, noncarcinogenic, substantially nonleaching and durable over the lifespan of the bead.

13 Claims, 4 Drawing Sheets

2,4,4'-trichloro-2'-hydroxy diphenol ether

Methyl Methacrylate      Divinylbenzene

Methyl Methacrylate-Divinylbenzene
Copolymeric Resin

ANTIMICROBIAL SYNTHETIC ION EXCHANGE RESINS

CROSS REFERENCE TO RELATED APPLICATION

This application claims the benefit of U.S. Provisional Application No. 60/170,018 filed on Dec. 10, 1999.

BACKGROUND OF THE INVENTION

1. Field of the Invention

This invention relates generally to antimicrobial synthetic ion exchange resins, and more particularly to synthetic ion exchange resins having antimicrobial agents encapsulated within micropores of the resins, which are used extensively in the softening of water.

2. Prior Art

Costin, U.S. Pat. No. 4,076,622, teaches a large pore macroreticular strong base anion exchange resin containing quaternary ammonium groups, tertiary sulfonium groups, quaternary phosphonium groups, alkyl pyridinium groups, or other similar moieties, for purifying aqueous solutions. The microbiocidal composition is a heavy metal halide salt of limited water solubility, such as silver chloride. The microbiocides are chemically or physically bound to the large pore macroreticular strong base anion exchange resin. Chemical binding occurs when the halide anion of the heavy metal halide salt, which is present in solution, replaces the anion originally attached to the resin and chemically bonds to the anion exchange moiety of the resin. Furthermore, the heavy metal cation of the heavy metal halide salt becomes associated with the anion, which was originally attached to the resin, and remains in the aqueous phase. Unlike chemical binding, physical binding involves the heavy metal cation of the heavy metal halide salt becoming associated with the anion, which was originally attached to the resin, and precipitating out of solution, as opposed to remaining in the aqueous phase, upon cooling and becoming physically bound within the pores located on the surface of the resin.

Hatch, U.S. Pat. No. 4,187,183 and U.S. Pat. No. 4,190,529, teach a strong base anion exchange resin containing quaternary ammonium groups, tertiary sulfonium groups, quaternary phosphonium groups, alkyl pyridinium groups, or other similar moieties, for treating high salt solutions. The bactericide is a halide ion, such as iodide or bromide, and a hypohalous acid, such as hypoiodous acid or hypobromous acid. A scavenger resin or activated charcoal must be utilized for removal or reduction of residual halogenated bactericide eluted downstream from the strong base anion exchange resin in order to purify the water meant for human consumption.

Slejko, U.S. Pat. No. 4,199,449, teaches an ion exchange column, for removing bacteria from water, having a filter with submicron pores that become clogged to indicate that the bacteria removal capacity of the column is exhausted. More specifically, the column has a large pore macroreticular strong base anion exchange resin, with or without microbiocides that may or may not be chemically or physically bound thereto, disposed within the column for removing bacteria from an aqueous influent. The column also has a submicron filter disposed downstream of the resin. Once the capacity of the resin for removing bacteria is exhausted, the submicron pores of the filter quickly become clogged with bacteria present within the aqueous effluent from the resin. Clogging causes a pressure buildup that noticeably reduces the flow of liquid exiting the filter, thereby indicating that the bacteria removal capacity of the resin within the column is exhausted.

Dillman, U.S. Pat. No. 4,382,862, teaches a cartridge, for removing impurities from water, having an elongated tube and an inlet cap separated from the elongated tube by a water permeable barrier. The elongated tube contains a large pore macroreticular quaternary ammonium anion exchange resin. The inlet cap contains a water soluble bactericide, which is calcium hypochlorite or a sodium salt of dichloroisocyanuric acid. The bactericide kills bacteria present within the incoming water prior to the water reaching the resin. Once in solution, the water soluble bactericide permeates through the barrier and also kills bacteria present in the pores and on the surface of the resin. Once the bactericide is exhausted, the resin eliminates bacteria until its capacity to eliminate bacteria is also exhausted. As a result, water recovered from the cartridge must be monitored, either continuously or at least intermittently, for the presence of bactericide or bacteria in aqueous solution.

From the aforementioned, it is readily apparent that synthetic anion exchange resins are useful for purifying water meant for human consumption. On the other hand, synthetic cation exchange resins are useful for softening water, which is accomplished by exchanging calcium and magnesium cations, present within aqueous solution, with sodium, potassium or hydrogen cations. Additionally, synthetic ion exchange resins are used in the industrial production of demineralized or deionized water.

Unfortunately however, conventional synthetic ion exchange resins utilized for softening water allow bacteria to anchor themselves onto the surface of the resin and then enter the micropores oft he resin where the bacteria are effectively shielded from disinfecting treatments. Shielding from disinfecting treatments results in the proliferation of a large number of bacteria on a conventional synthetic ion exchange bead, which is manufactured from the resin. As a result, a larger number of bacteria exist in the emerging water following ion exchange treatment than were present in the water that was introduced prior to ion exchange treatment. In addition, shielded bacteria assist in the formation of a biofilm on the bead. The biofilm creates a physical barrier between the ion exchange functional groups on the bead and the neighboring hard or unsoftened water. Therefore, water softening effectiveness of the ion exchange resin is detrimentally impaired.

The term "bacteria" encompasses many bacterial strains including gram negative bacteria and gram positive bacteria. Examples of gram negative bacteria include: Acinebacter; Aeromonas; Alcaligenes; Chromobacterium; Citrobacter; Enterobacter; Escherichia; Flavobacterium; Klebsiella; Moraxella; Morganella; Plesiomonas; Proteus; Pseudomonas; Salmonella; Serratia; and Xanthomonas. Examples of gram positive bacteria include: Arthrobacter; Bacillus; Micrococcus; Mycobacteria; Sarcina; Staphylococcus; and Streptococcus. Many of the aforementioned bacterial strains, such as Acinebacter; Aeromonas; Alcaligenes; Arthrobacter; Bacillus; Chromobacterium; Flavobacterium; Micrococcus; Moraxella; Mycobacteria; Plesiomonas; Proteus; Pseudomonas; Sarcina and others, are further referred to as heterotrophic bacteria, as they are extremely hardy and can readily grow in nutrient-poor water. As a result, these heterotrophic bacterial organisms are capable of establishing large population colonies on conventional synthetic ion exchange resins. The media and the growth conditions used during the isolation of such organisms determine the nature of a Heterotrophic Plate Count (HPC). The media used to isolate HPC is a non-selective, low nutrient, solid gel matrix known as R2A agar. During incubation at 30° C. for one week, the media allows the growth of a variety of organisms that grow in highly purified water under low nutrient environments. Heterotrophic bacteria include harmless groups of bacteria, as well as some opportunistic and disease causing bacteria, such as: Acinebacter; Aeromonas; Flavobacterium; Moraxella; Mycobacteria; Plesiomonas; and Pseudomonas.

The presence of these opportunistic, disease causing bacteria is considered to be especially harmful to the immunocompromised and elderly populations. Because of this, HPC has been used to indicate residual chlorine disinfection and evaluate the overall quality and effectiveness of water treatment. In the United States, the Environmental Protection Agency (EPA) has a maximum allowable standard of 500 Colony Forming Units (CFU) per milliliter (ml) of water. On the other hand, Europe has a maximum allowable standard of only 100 CFU/ml.

Water softening devices using conventional synthetic ion exchange resins are known to create an HPC from about 10,000 to about 100,000 or more CFU/ml of water. A European study (Water Technology, February, 1999) found that water softening treatment resulted in a fifteen fold increase in heterotrophic bacteria and an astonishing thirty fold increase in gram negative bacteria. Because of Europe's more stringent standards, many European Countries do not permit the use of water softeners without the utilization of further downstream disinfection.

Conventional synthetic ion exchange resins are recently being used for a newly emerging technology that is termed "electrodeionization". The technology of electrodeionization is gaining popularity because it does not use large amounts of salt, acid and caustic solutions during the regeneration of ion exchange capacity. In general, electrodeionization is a combination of mixed bed ion exchange and electrodialysis. More specifically, electrodeionization stacks are composed of mixed bed ion exchange resins packed in a specific arrangement between separate cation and anion exchange membranes. As direct current electricity is passed through the electrodeionization stacks, ions are removed from an incoming stream of water influent and transferred to a refuse stream without the use of any chemicals. After a majority of the strongly ionized components are removed, the electric current then decomposes the water effluent into its associated ions (hydrogen cation $H^+$ and hydroxide anion $OH^-$), which regenerates the resins. Because electrodeionization stacks use conventional ion exchange resins, as does water softening devices, electrodeionization stacks are likewise equally subject to harboring proliferating heterotrophic bacterial colonies and the subsequent formation of biofilm.

What is therefore needed is a method of preventing the growth of heterotrophic bacteria and the subsequent establishment of biofilm on the surface and in the micropores of the synthetic ion exchange resin. Further needed is a synthetic ion exchange resin that prevents the growth of heterotrophic bacteria and the subsequent establishment of biofilm on the surface and in the micropores of the resin. Further needed is a submicron size, high surface area, broad spectrum antimicrobial agent, which can be encapsulated within the micropores of synthetic ion exchange resin, that is nontoxic, noncarcinogenic, substantially nonleaching and durable over the lifespan of the resin.

SUMMARY OF THE INVENTION

In a broad sense, the present invention is a method of incorporating an antimicrobial agent in a synthetic ion exchange resin to protect the resin from microorganisms. More specifically, the present invention is a method of encapsulating an antimicrobial agent within a plurality of micropores of a synthetic ion exchange resin to protect the resin from the growth of heterotrophic bacteria and the subsequent establishment of a biofilm on the surface and in the micropores of the resin. Encapsulation of the antimicrobial agent is accomplished by first solubilizing the antimicrobial agent in an organic phase of a liquid monomer mixture. Second, the liquid monomer mixture is suspension polymerized. Third, the antimicrobial agent is precipitated and encapsulated within a plurality of micropores of the resin. The antimicrobial agent then exhibits migration from the micropores thereby preventing the growth of the bacteria and the establishment of the biofilm on the resin.

The method of encapsulating an antimicrobial agent within a plurality of micropores of a synthetic ion exchange resin may be applied without a substantial amount of deviation from conventional techniques of manufacturing conventional synthetic ion exchange beads from such resins. First, predetermined quantities of deaerated water, a dispersing agent, a surfactant, a catalyst, a divinylbenzene monomer, an antimicrobial agent, and a styrene monomer, or alternatively an acrylic monomer, are combined to provide a mixture. Second, the mixture is stirred at about 75° C. to about 85° C. for about 12 hours to about 24 hours. Third, the beads of an antimicrobial styrene-divinylbenzene copolymeric synthetic ion exchange resin, or alternatively an antimicrobial acrylic-divinylbenzene copolymeric synthetic ion exchange resin, are filtered from the mixture. Fourth, the beads are washed with water. Fifth, the beads are vacuum oven dried. Preferably, the beads are oven dried under vacuum at about 55° C. to about 65° C.

The present invention is also an antimicrobial synthetic ion exchange resin, which is used extensively in the softening or electrodeionization of water, that prevents the growth of heterotrophic bacteria and the subsequent establishment of biofilm on the surface and in the micropores of the resin. The antimicrobial synthetic ion exchange resin is composed of a styrene-divinylbenzene copolymer having a styrene monomer, a divinylbenzene monomer and an antimicrobial agent incorporated into the styrene-divinylbenzene copolymer. Alternatively, the antimicrobial synthetic ion exchange resin is composed of an acrylic-divinylbenzene copolymer having an acrylic monomer, a divinylbenzene monomer and an antimicrobial agent incorporated into the acrylic-divinylbenzene copolymer.

The invention also includes an electrodeionization membrane having at least one antimicrobial synthetic cation exchange resin and at least one antimicrobial synthetic anion exchange resin. The antimicrobial synthetic cation exchange resin is composed of a styrene-divinylbenzene copolymer and an antimicrobial agent incorporated therein. Alternatively, the antimicrobial synthetic cation exchange resin is composed of an acrylic-divinylbenzene copolymer and an antimicrobial agent incorporated therein. The antimicrobial synthetic anion exchange resin is composed of a styrene-divinylbenzene copolymer and an antimicrobial agent incorporated therein. Alternatively, the antimicrobial synthetic anion exchange resin is composed of an acrylic-divinylbenzene copolymer and an antimicrobial agent incorporated therein.

The present invention is also a submicron size, high surface area, broad spectrum antimicrobial agent, which can be encapsulated within the micropores of the resin, that is nontoxic, noncarcinogenic, substantially nonleaching and durable over the lifespan of the resin. Once encapsulated within the micropores of the antimicrobial resin, the antimicrobial agent exhibits migration into and through a plurality of amorphous regions within a polymeric matrix of the resin and subsequently onto the surface of the resin, until a point of equilibrium is reached. As the surface of the resin is abraded by water during softening or electrodeionization, the point of equilibrium is disrupted, which stimulates additional migration of the antimicrobial agent from the micropores to the surface of the resin until equilibrium is again reached. As a result, the antimicrobial agent protects the antimicrobial synthetic ion exchange bead from the growth of heterotrophic bacteria and the subsequent establishment of biofilm on the surface and in the micropores of the resin during water softening or electrodeionization techniques. Furthermore, the broad spectrum antimicrobial agent is an organic microbiocidal compound that is insoluble in water, substantially nonleaching and durable over the lifespan of the resin.

BRIEF DESCRIPTION OF THE DRAWINGS

The foregoing and other objects will become more readily apparent by referring to the following detailed description and the appended drawings in which.

DETAILED DESCRIPTION

Synthetic Ion Exchange Resins

Figure 1:
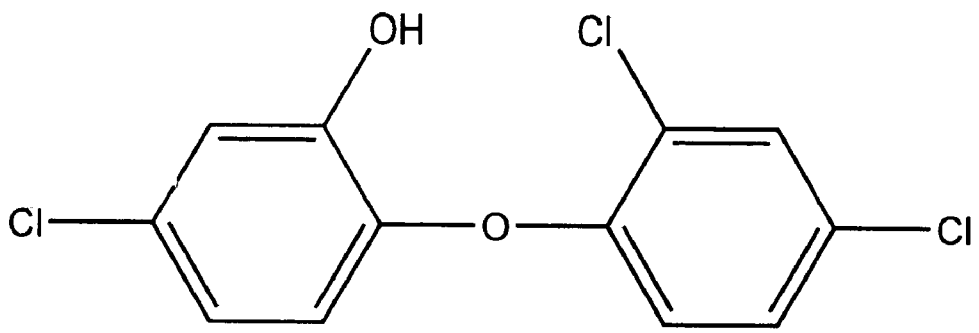
FIG. 1 illustrates the chemical structure of an antimicrobial agent in accordance with the present invention.

Typically, synthetic ion exchange resins are copolymers of styrene and divinylbenzene. (Kirk-Othmer Encyclopedia of Chemical Technology; 4th ed., Vol. 14, p. 737 (1991)). The technology for synthesizing such styrene-divinylbenzene copolymeric ion exchange resins dates back to early 1940. Since the late 1980's however, another development has been the use of acrylic monomers, such as, acrylic acid, methacrylic acid or esters of these acids, in combination with divinylbenzene to produce another class of synthetic ion exchange resins, namely acrylic-divinylbenzene copolymeric ion exchange resins.

Styrene-divinylbenzene and acrylic-divinylbenzene copolymeric ion exchange resins are synthesized as polymeric ion exchange beads via suspension copolymerization within a two-phase system, wherein an organic liquid monomer mixture is dispersed as droplets within an aqueous media. The size and the uniformity of the polymeric ion exchange beads are directly dependent upon the uniformity in size and distribution of the droplets of organic liquid monomer mixture within the aqueous phase. The uniformity in size and distribution of the droplets of monomer mixture is, in turn, dependent upon the relative disturbance of the monomer mixture within the aqueous phase. As the disturbance of the monomer mixture within the aqueous phase increases, the uniformity in size and distribution of the droplets increases proportionately.

The organic and aqueous phases are prepared in separate tanks and then transferred to a reaction vessel, otherwise known as a reactor. The design and operation of these reactors are known to those skilled in the art. For example, the size, shape and speed of mixers, as well as baffling, which protrudes towards the center of the reaction vessel, are known factors that control the critical element of fluid flow within the reactor. The degree of fluid flow is directly proportional to the degree of disturbance of the monomer mixture within the aqueous phase. In addition, these reactors are closed to the atmosphere and are also jacketed to allow the introduction or removal of heat.

The organic phase of the styrene-divinylbenzene or acrylic-divinylbenzene liquid monomer mixture consists from about 5 percent to about 10 percent by weight of divinylbenzene monomer and from about 95 percent to about 90 percent by weight of styrene or acrylic monomer, respectively. The presence of divinylbenzene monomer promotes random crosslinking. Therefore, increased amounts of divinylbenzene monomer leads to the creation of polymeric ion exchange beads having a higher degree of random crosslinking.

A catalyst, such as benzoyl peroxide, alkali persulfate, hydro-peroxides or hydrogen peroxide-ferrous ion, which is utilized to initiate polymerization, is incorporated into the aqueous phase along with organic dispersing agents (i.e., sodium lauryl sulfate, sodium dodecyl benzenesulfonate, dodecylamine hydrochloride, polyacrylic acid, gelatin, cellulose and pectins) and inorganic dispersing agents (i.e., phosphates, aluminum hydroxide, zinc oxide, magnesium silicate and kaolin). The concentration of these dispersing agents are typically in the range from about 1 percent to about 3 percent by weight of the aqueous phase. During bead formation, the polymerization front proceeds from the outer periphery of the droplet of the organic liquid monomer mixture to the interior of the droplet.

Styrene-divinylbenzene or acrylic-divinylbenzene copolymeric resins are further subjected to functionalization reactions which convert them to either synthetic cation or anion exchange resins. Particularly for the application of softening water, which consists of replacing calcium and magnesium cations, present within aqueous solution, with sodium, potassium or hydrogen cations, strong cation exchange resins are used. Resin functionalization reactions are as follows:

(1) Strong Cation Exchange—Sulfonation.
(2) Weak Cation Exchange—Hydrolysis of ester group with acid or base.
(3) Strong Anion Exchange—Chloromethylation and amination to form quaternary ammonium functional group.
(4) Weak Anion Exchange—Chloromethylation and amination.

Production of a high HPC in water softeners is attributable to the growth of heterotrophic bacteria and the subsequent establishment of biofilm on the surface and in the micropores of conventional synthetic ion exchange resin. More specifically, once attached to the surface or within the micropores of the resin, heterotrophic bacteria exude a sticky slimy substance, known as exopolysaccharide, which subsequently builds up and creates a biofilm where large numbers of heterotrophic bacteria and other microorganisms, such as fungi and algae, are held together and proliferate. The sticky slimy biofilm, which may be one hundred or more times the mass of the heterotrophic bacterial cells, aids anchoring of the heterotrophic bacteria to the resin and protectively shields the heterotrophic bacteria from disinfecting agents. Heterotrophic bacteria and other microorganisms protected within the biofilm proliferate and enter into the water exiting the softner, either continuously or intermittently. Thus, the biofilm acts as a major source of water contamination of the effluent.

The ability of heterotrophic bacteria to anchor themselves on the surface and within the micropores of the resin is dependant upon the porosity of the conventional synthetic ion exchange bead. The porosity of the bead is inversely proportional to the degree of crosslinking associated within the resin. That is, as the degree of crosslinking or percentage of divinylbenzene used during the suspension polymerization reaction increases, the porosity oft he resin decreases. As the porosity of the resin decreases, the resin becomes more compact and thus more resistant to heterotrophic bacteria anchoring themselves on the surface and within the micropores of the resin. Unfortunately however, as the resin becomes less porous, the ability of the resin to replace calcium and magnesium cations, present within the surrounding aqueous solution, with sodium, potassium or hydrogen cations, is decreased. Therefore, a need exists for an antimicrobial synthetic ion exchange resin having a relatively high degree of porosity that provides for optimal water softening efficiency, in addition to desired antimicrobial characteristics that prevent the anchoring of heterotrophic bacteria on the surface and within the micropores of the resin.

Antimicrobial Synthetic Ion Exchange Resins

The present invention encapsulates submicron size, high surface area, broad spectrum antimicrobial agent, which is organic and thus insoluble in water, into a plurality of micropores of the resin during the suspension polymerization. As a result, an antimicrobial synthetic ion exchange bead (bead), which is manufactured from an antimicrobial synthetic ion exchange resin (resin) having antimicrobial agent encapsulated within a plurality of micropores of the resin, is protected from the growth and proliferation of heterotrophic bacteria and the subsequent establishment of a biofilm.

Although the antimicrobial agent of the present invention is readily soluble in the droplets of the organic phase, which consists of a styrene-divinylbenzene or acrylic-divinylbenzene liquid monomer mixture, the organic antimicrobial agent is insoluble in the surrounding aqueous phase. Therefore, as the suspension polymerization reaction is initiated at the organic-aqueous interface along the outer periphery of the droplet and the polymerization front proceeds towards the interior of the droplet during bead formation, the organic antimicrobial agent merely precipitates out of solution as an insoluble solid. As a result, the antimicrobial agent becomes physically entrained or encapsulated within the micropores of the resin. The microorganism protected bead may then be further reacted by conventional means to give it required functionality, such as cation or anion exchange, necessary for application of conventional water softening or novel electrodeionization techniques.

Once encapsulated within the micropores of the resin, the antimicrobial agent exhibits migration into and through a plurality of amorphous regions within a polymeric matrix of the resin and subsequently onto the surface of the resin, until a point of equilibrium is reached. As the surface of the resin is abraded by water during softening or electrodeionization, the point of equilibrium is disrupted, which stimulates additional migration of the antimicrobial agent from the micropores of the surface of the resin until equilibrium is again reached. As a result, the antimicrobial agent protects the bead from the growth of heterotrophic bacteria and the subsequent establishment of biofilm on the surface and in the micropores of the resin during application of conventional water softening or novel electrodeionization techniques.

FIG. 1 illustrates the chemical structure of an antimicrobial agent in accordance with the present invention. The antimicrobial agent is 2,4,4'-trichloro-2'-hydroxy diphenol ether, otherwise referred to as 5-chloro-2-phenol(2,4-dichlorophenoxy). The antimicrobial agent is a broad spectrum antimicrobial agent that demonstrates desired antimicrobial efficacy against heterotrophic bacteria. The organic antimicrobial agent is insoluble in water and substantially nonleaching in that sufficient antimicrobial agent may be incorporated into the micropores of the resin during suspension polymerization to provide for desired antimicrobial properties that are durable throughout the useful life of the bead. In addition, the antimicrobial agent is nontoxic and noncarcinogenic.

Manufacture of Antimicrobial Styrene-Divinylbenzene Copolymeric Resin

Figure 2:
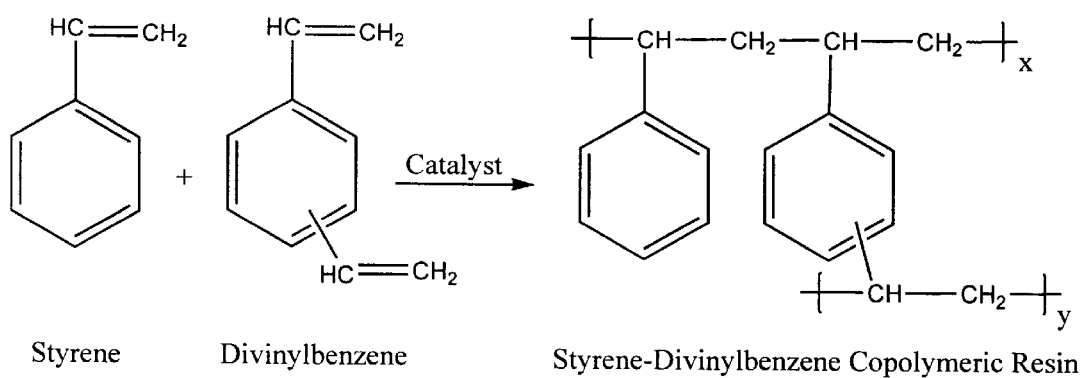
FIG. 2 illustrates a suspension polymerization reaction between styrene monomer and divinylbenzene monomer, in the presence of a catalyst, to produce a styrene-divinylbenzene copolymeric resin.

FIG. 2 illustrates a suspension polymerization reaction between styrene monomer and divinylbenzene monomer, in the presence of catalyst, to produce a styrene-divinylbenzene copolymeric resin.

To a 2 liter round bottomed flask equipped with a mechanical stirrer and a condenser and maintained at a temperature of about 80° C., the following ingredients were added: (1) 500 ml of deaerated water; (2) 0.1 grams (g) of sodium lauryl sulfate (dispersing agent/surfactant); (3) 1.5 g of sodium polyacrylate (dispersing agent/surfactant); (4) 5 g of sodium sulfate (dispersing agent/surfactant); (5) an intimate mixture of 135 g of styrene (monomer), 13.5 g of divinylbenzene (monomer) and 1.5 g of 2,4,4'-trichloro-2'-hydroxy diphenol ether (antimicrobial agent); (6) 0.7 g of benzoyl peroxide (catalyst); and (7) 1.5 g of sodium polymethacrylate (dispersing agent/surfactant). The mixture is stirred vigorously and maintained at 80° C. for about 12 hours to about 24 hours. Effective agitation during the suspension polymerization reaction is necessary until the beads attain a solid consistency. At the end of this period, the beads of styrene-divinylbenzene copolymeric resin are filtered, washed with water and oven dried at about 60° C. under vacuum. The suspension polymerization reaction is complete at this point.

The presence of dispersing agents and surfactants within the reaction vessel aids in preventing fusion and coalescing of not only the droplets of organic liquid monomer mixture during suspension polymerization, but also the resultant beads following completion of the polymerization reaction. Sodium polymethacrylate, in particular, acts as a suspending agent and prevents the fusion and coalescing of the beads following completion of the polymerization reaction.

In accordance with the present invention, the antimicrobial agent is dissolved in the droplet of styrene-divinylbenzene liquid monomer mixture between about 0.01 percent to about 10 percent by weight of the styrene-divinylbenzene liquid monomer mixture during the suspension polymerization. Preferably, the antimicrobial agent is dissolved in the droplet of styrene-divinylbenzene liquid monomer mixture between about 0.25 percent to about 6 percent by weight of the styrene-divinylbenzene liquid monomer mixture. More preferably, the antimicrobial agent is dissolved in the droplet of styrene-divinylbenzene liquid monomer mixture between about 0.5 percent to about 2 percent by weight of the styrene-divinylbenzene liquid monomer mixture. Even more preferably, the antimicrobial agent is dissolved in the droplet of styrene-divinylbenzene liquid monomer mixture between about 0.75 percent to about 1.75 percent by weight of the styrene-divinylbenzene liquid monomer mixture.

The antimicrobial agent, which becomes physically entrained or encapsulated within the micropores of the resin, does not participate in the suspension polymerization reaction during bead formation. In addition, the antimicrobial agent encapsulated within the micropores of the antimicrobial styrene-divinylbenzene copolymeric resin is unaffected during functionalization reactions, which introduce desired functionality to the bead.

Figure 3:
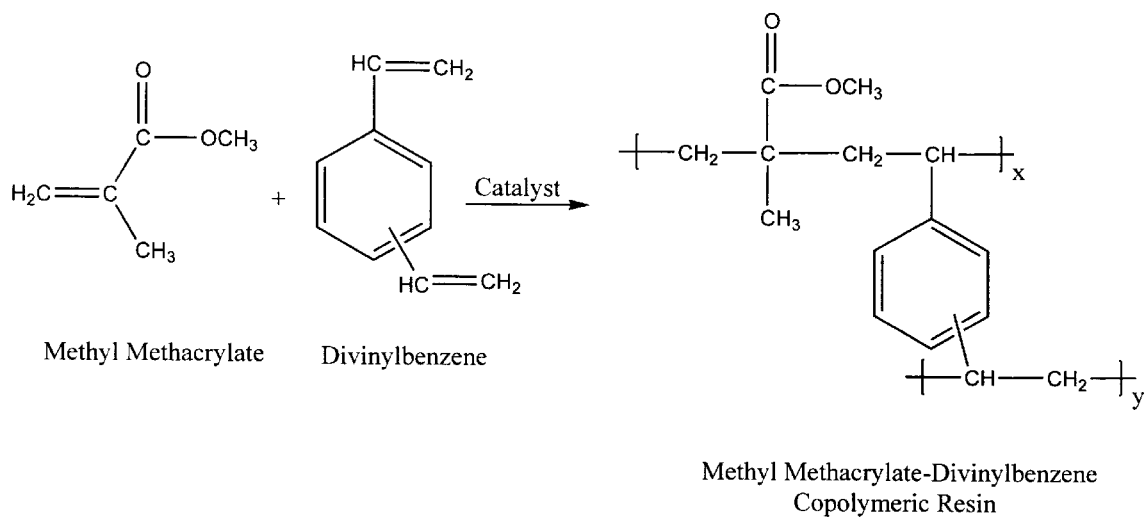
FIG. 3 illustrates a suspension polymerization reaction between methyl methacrylate monomer and divinylbenzene monomer, in the presence of a catalyst, to produce a methyl methacrylate-divinylbenzene copolymeric resin.

Manufacture of Antimicrobial Methyl Methacrylate-Divinylbenzene Copolymeric Resin FIG. 3 illustrates a suspension polymerization reaction between methyl methacrylate monomer and divinylbenzene monomer, in the presence of catalyst, to produce a methyl methacrylate-divinylbenzene copolymeric resin. Aside from the utilization of styrene monomer, the method of producing an antimicrobial acrylic-divinylbenzene copolymeric resin is identical to that described above for the synthesis of the antimicrobial styrene-divinylbenzene copolymeric resin. In essence, acrylic monomers, such as acrylic acid, methacrylic acid, or esters of these acids, are utilized in place of styrene monomers. Furthermore, the antimicrobial agent encapsulated within the micropores oft he antimicrobial methyl methacrylate-divinylbenzene copolymeric resin is unaffected during functionalization reactions, which introduce desired functionality to the bead.

Figure 4:
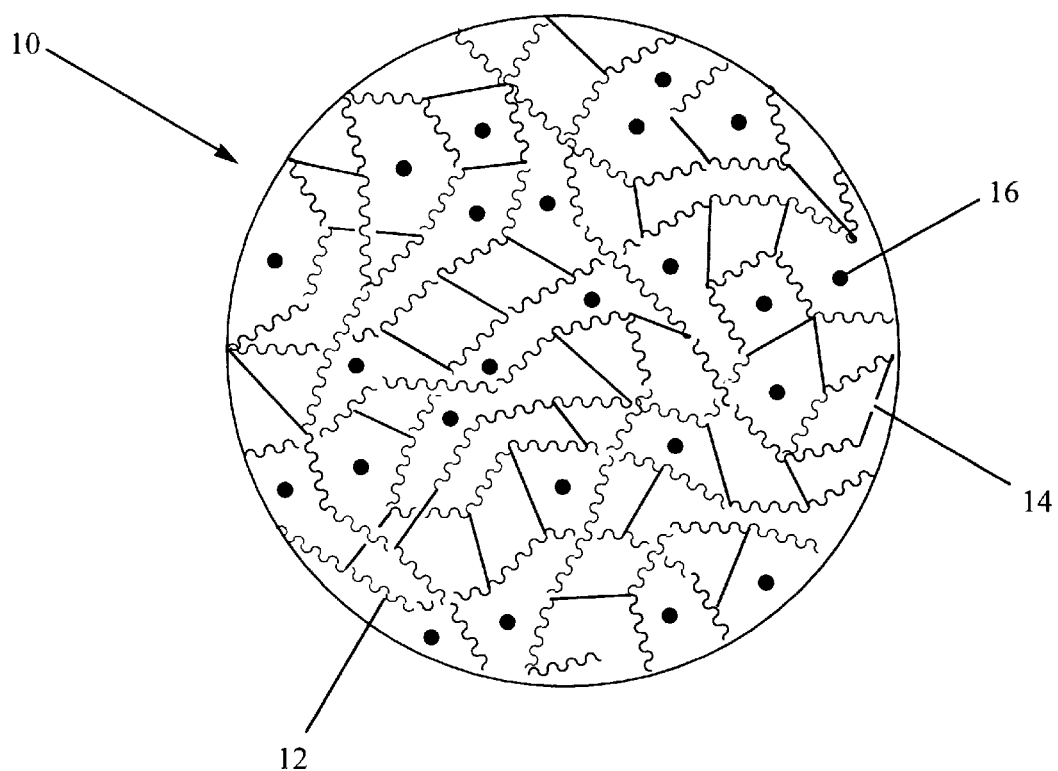
FIG. 4 is a cross-sectional view of an antimicrobial synthetic ion exchange bead manufactured from a styrene-divinylbenzene copolymeric resin, having antimicrobial agent encapsulated within micropores of the resin, in accordance with the present invention.

Antimicrobial Synthetic Ion Exchange Bead of Styrene-Divinylbenzene Copolymeric Resin FIG. 4 is a cross-sectional view of an antimicrobial synthetic ion exchange bead manufactured from a synthetic ion exchange resin having antimicrobial agent encapsulated within micropores of the resin in accordance with the present invention. The resulting antimicrobial synthetic ion exchange bead 10 of styrene-divinylbenzene copolymeric resin, formed in accordance with the present invention, has polystyrene chains 12 that are crosslinked by divinylbenzene 14. The antimicrobial agent 16 is encapsulated within the micropores of the resin of the bead 10 and exhibits migration into and through a plurality of amorphous regions within a polymeric matrix of the resin and subsequently onto the surface of the resin, until a point of equilibrium is reached.

Antimicrobial Efficacy

To illustrate antimicrobial efficacy, the beads produced in accordance with the present invention were tested for antimicrobial efficacy using American Association of Textile Chemists and Colorists Procedures (AATCC) test method 147, or Kirby-Bauer test method, in which, after a predetermined period of time, the zone of inhibition of the organism (i.e., gram negative *Escherichia coli* or gram positive *Staphylococcus aureus*) was measured in millimeters (mm). Zones of inhibition in excess of 5 mm were obtained. The aforementioned laboratory results indicate that the surface and the micropores of the resin have been rendered hostile to the survival and growth of the bacteria. As a result, the growth of heterotrophic bacteria and the subsequent establishment of biofilm on the surface and in the micropores of the bead is prevented.

The beads produced, in accordance with the present invention, may subsequently be subjected to secondary chemical reactions such as sulfonation to produce strong cation exchange resins, hydrolysis of ester groups to produce weak cation exchange resins, and chloromethylation and amination to form quaternary ammonium groups for strong or weak anion exchange resins. As previously mentioned, the antimicrobial agent is unaffected by these secondary reactions that create desired functionality in the bead. Conventional manufacturing techniques of synthetic ion exchange resins are found in Kirk-Othmer Encyclopedia of Chemical Tech., 4th ed., Vol. 14, pg. 737 (1991).

Encapsulation of the antimicrobial agent within the micropores of the resin may be accomplished by other polymerization techniques and is thus not limited to the exact method of suspension polymerization previously disclosed.

It is to be understood that the foregoing description and specific embodiments are merely illustrative of the best mode of the invention and the principles thereof, and that various modifications and additions may be made to the method of manufacture and to the chemical composition by those skilled in the art, without departing from the spirit and scope oft his invention, which is therefore understood to be limited only by the scope of the appended claims.

What is claimed is:

1. A method of incorporating an antimicrobial agent in a synthetic ion exchange resin to protect said resin from the growth of heterotrophic bacteria and formation of a biofilm, said method comprising the steps of:
   (A) solubilizing an antimicrobial agent in an organic phase of a liquid monomer mixture;
   (B) suspension polymerizing said liquid monomer mixture to form a resin;
   (C) precipitating and encapsulating said antimicrobial agent within a plurality of micropores of said resin; and
   (D) functionalizing said resin to form one of the following ion exchange resins:
      (1) a strong cation exchange resin by sulfonation; or
      (2) a weak cation exchange resin by hydrolysis of ester groups with acid or base; or
      (3) a strong anion exchange resin by chloromethylation and amination to form quaternary ammonium functional group; or
      (4) a weak anion exchange resin by chloromethylation and amination;
   wherein said antimicrobial agent exhibits migration from said micropores thereby preventing the growth of bacteria and the establishment of a biofilm on said resin.

2. A method of synthesizing an antimicrobial synthetic ion exchange resin by incorporating an antimicrobial agent in a synthetic resin during manufacture of a plurality of antimicrobial synthetic ion exchange resin beads, said method comprising the steps of:
   (A) providing a mixture comprising predetermined quantities of:
      (1) deaerated water;
      (2) a dispersing agent;
      (3) a surfactant;
      (4) a catalyst;
      (5) a styrene monomer;
      (6) a divinylbenzene monomer; and
      (7) an antimicrobial agent;
   (B) stirring said mixture at about 75° C. to about 85° C. for about 12 hours to about 24 hours to form beads of an antimicrobial styrene-divinylbenzene copolymeric resin from said mixture;
   (C) filtering said beads;

(D) washing said beads with water;

(E) oven drying said beads; and (F) functionalizing said beads to form a synthetic ion exchange resin.

3. A method in accordance with claim 2, wherein said stirring step further comprises stirring said mixture at about 80° C. for about 12 hours to about 24 hours.

4. A method in accordance with claim 2, wherein said oven drying step further comprises oven drying said beads under vacuum at about 55° C. to about 65° C.

5. A method in accordance with claim 2 wherein said functionalizing step comprises:

sulfonating said beads of antimicrobial styrene-divinylbenzene copolymeric resin to produce strong cation exchange resins.

6. A method in accordance with claim 2 wherein said beads contain ester groups and wherein said functionalizing step comprises:

hydrolyzing said ester groups of said beads of antimicrobial styrene-divinylbenzene copolymeric resin to produce weak cation exchange resins.

7. A method in accordance with claim 2 wherein said functionalizing step comprises:

chloromethylating and aminating said beads of antimicrobial styrene-divinylbenzene copolymeric resin to form quaternary ammonium groups to produce strong or weak anion exchange resins.

8. A method of synthesizing an antimicrobial synthetic ion exchange resin by incorporating an antimicrobial agent in a synthetic resin during manufacture of a plurality of antimicrobial synthetic ion exchange resin beads, said method comprising the steps of:

(A) providing a mixture comprising predetermined quantities of (1) deaerated water;

(2) a dispersing agent;

(3) a surfactant;

(4) a catalyst;

(5) an acrylic monomer;

(6) a divinylbenzene monomer; and (7) an antimicrobial agent;

(B) stirring said mixture at about 75° C. to about 85° C. for about 12 hours to about 24 hours to form beads of an antimicrobial acrylic-divinylbenzene copolymeric resin from said mixture;

(C) filtering said beads;

(D) washing said beads with water;

(E) oven drying said beads; and (F) functionalizing said beads to form a synthetic ion exchange resin.

9. A method in accordance with claim 8, wherein said stirring step further comprises stirring said mixture at about 80° C. for about 12 hours to about 24 hours.

10. A method in accordance with claim 8, wherein said oven drying step further comprises oven drying said beads under vacuum at about 55° C. to about 65° C.

11. A method in accordance with claim 8 wherein said functionalizing step comprises:

sulfonating said beads of antimicrobial acrylic-divinylbenzene copolymeric resin to produce strong cation exchange resins.

12. A method in accordance with claim 8 wherein said beads contain ester groups and wherein said functionalizing step comprises:

hydrolyzing said ester groups of said beads of antimicrobial acrylic-divinylbenzene copolymeric synthetic ion exchange resin to produce weak cation exchange resins.

13. A method in accordance with claim 8 wherein said functionalizing step comprises:

chloromethylating and aminating said beads of antimicrobial acrylic-divinylbenzene copolymeric synthetic ion exchange resin to form quaternary ammonium groups to produce strong or weak anion exchange resins.

* * * * *